United States Patent
Seo

(10) Patent No.: US 11,109,383 B2
(45) Date of Patent: Aug. 31, 2021

(54) METHOD FOR TRANSMITTING OR RECEIVING SIGNAL IN A WIRELESS COMMUNICATION SYSTEM AND APPARATUS THEREFOR

(71) Applicant: LG ELECTRONICS INC., Seoul (KR)

(72) Inventor: Inkwon Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 16/492,592

(22) PCT Filed: Mar. 12, 2018

(86) PCT No.: PCT/KR2018/002877
§ 371 (c)(1),
(2) Date: Sep. 9, 2019

(87) PCT Pub. No.: WO2018/164550
PCT Pub. Date: Sep. 13, 2018

(65) Prior Publication Data
US 2021/0144713 A1    May 13, 2021

Related U.S. Application Data

(60) Provisional application No. 62/469,520, filed on Mar. 10, 2017.

(51) Int. Cl.
*H04W 72/04* (2009.01)
*H04B 7/0452* (2017.01)
*H04L 1/00* (2006.01)

(52) U.S. Cl.
CPC ...... *H04W 72/0493* (2013.01); *H04B 7/0452* (2013.01); *H04L 1/0038* (2013.01);
(Continued)

(58) Field of Classification Search
CPC ......... H04W 72/0493; H04W 72/0453; H04W 72/0446; H04W 72/042; H04L 1/0038; H04B 7/0452
See application file for complete search history.

(56) References Cited

U.S. PATENT DOCUMENTS

2013/0195275 A1 * 8/2013 Koivisto ............... H04L 1/06
380/287
2015/0304991 A1 * 10/2015 Chen .................. H04W 72/005
370/329

OTHER PUBLICATIONS

PCT International Application No. PCT/KR2018/002877, Written Opinion of the International Searching Authority dated Jun. 7, 2018, 22 pages.

(Continued)

*Primary Examiner* — Dady Chery
(74) *Attorney, Agent, or Firm* — Lee, Hong, Degerman, Kang & Waimey

(57) ABSTRACT

A method according to an embodiment of the present invention, in which a terminal receives downlink control information from a base station in a wireless communication system comprises: a step of receiving information on an antenna port from the base station; a step of performing blind detection of a control channel on the basis of the information on the antenna port; and a step of obtaining downlink control information carried by the control channel through the blind detection, wherein it can be assumed that the information on the antenna port indicates the at least one antenna port to be monitored by the terminal among the plurality of antenna ports used by the base station for the control channel transmission, and the terminal while performing the blind detection applies a specific transmission diversity scheme to at least one antenna port indicated through the information on the antenna port. The terminal is capable of communicating with at least one of another
(Continued)

terminal, a terminal related to an autonomous driving vehicle, the base station or a network.

13 Claims, 8 Drawing Sheets

(52) U.S. Cl.
CPC ..... *H04W 72/042* (2013.01); *H04W 72/0446* (2013.01); *H04W 72/0453* (2013.01)

(56) References Cited

OTHER PUBLICATIONS

Huawei, et al., "Demodulation RS design for DL control channel", 3GPP TSG RAN WG1 Meeting #88, R1-1701636, Feb. 2017, 4 pages.
LG Electronics, "Discussion on search space design", 3GPP TSG RAN WG1 Meeting #88, R1-1702477, Feb. 2017, 3 pages.
Mediatek, "Discussion on NR-PDCCH structure", 3GPP TSG RAN WG1 Meeting #88, R1-1702722, Feb. 2017, 7 pages.
Qualcomm, "Tx diversity scheme for PDCCH", 3GPP TSG RAN WG1 Meeting #88, R1-1702624, Feb. 2017, 11 pages.
Samsung, "Resource Mapping for NR-PDCCH", 3GPP TSG RAN WG1 Meeting #88, R1-1702971, Feb. 2017, 4 pages.

\* cited by examiner

METHOD FOR TRANSMITTING OR RECEIVING SIGNAL IN A WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/002877, filed on Mar. 12, 2018, which claims the benefit of U.S. Provisional Application No. 62/469,520, filed on Mar. 10, 2017, the contents of which are all hereby incorporated by reference herein in their entirety.

TECHNICAL FIELD

The present invention relates to a wireless communication system and, more particularly, to a method of transmitting or receiving downlink control information in a wireless communication system and an apparatus therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/user equipment (UE) susceptible to latency and reliability, Ultra-Reliable and Low Latency Communication (URLLC) has been discussed in a next generation communication system.

As described above, a new RAT considering eMBB, mMTC and URLCC has been discussed for next generation wireless communication.

DETAILED DESCRIPTION OF THE INVENTION

Technical Problems

An object of the present invention is to provide a method of more efficiently and accurately transmitting and receiving a control channel carrying downlink control information.

The objects that could be achieved with the present disclosure are not limited to what has been particularly described hereinabove, and other objects that the present disclosure could achieve will be more clearly understood from the following detailed description.

Technical Solutions

According to an aspect of the present invention, provided herein is a method of receiving downlink control information from a base station (BS) by a user equipment (UE) in a wireless communication system, including receiving information about an antenna port from the BS; performing blind detection for a control channel based on the information about the antenna port; and acquiring downlink control information carried by the control channel through the blind detection. The information about the antenna port may indicate at least one antenna port that the UE should monitor among a plurality of antenna ports used by the BS for control channel transmission, and the UE may assume that a specific transmit diversity scheme is applied to the at least one antenna port indicated by the information about the antenna port in performing the blind detection.

In another aspect of the present invention, provided herein is a user equipment (UE) for receiving downlink control information, including a receiver; and a processor configured to control the receiver to receive information about an antenna port from a base station (BS), perform blind detection for a control channel based on the information about the antenna port, and acquire downlink control information carried by the control channel through the blind detection. The information about the antenna port may indicate at least one antenna port that the UE should monitor among a plurality of antenna ports used by the BS for control channel transmission, and the processor may assume that a specific transmit diversity scheme is applied to the at least one antenna port indicated by the information about the antenna port in performing the blind detection.

In another aspect of the present invention, provided herein is a method of transmitting downlink control information to a user equipment (UE) by a base station (BS) in a wireless communication system, including transmitting information about an antenna port to the UE; and transmitting a control channel carrying downlink control information of the UE based on the information about the antenna port. The information about the antenna port may indicate at least one antenna port that the UE should monitor among a plurality of antenna ports used by the BS for control channel transmission, and the BS may apply a specific transmit diversity scheme to at least one antenna port indicated by the information about the antenna port.

In another aspect of the present invention, provided herein is a base station (BS) for transmitting downlink control information, including a transmitter; and a processor configured to control the transmitter to transmit information about an antenna port to the UE and control the transmitter to transmit a control channel carrying downlink control information of the UE based on the information about the antenna port. The information about the antenna port may indicate at least one antenna port that the UE should monitor among a plurality of antenna ports used by the BS for control channel transmission, and the processor may apply a specific transmit diversity scheme to at least one antenna port indicated by the information about the antenna port.

The plural antenna ports may be orthogonal and other antenna ports except for the at least one antenna port used to transmit the control channel of the UE may be used to transmit control channels of other UEs to which the specific diversity scheme is applied.

The control channels of the other UEs and the control channel of the UE may be multiplexed on the same control resource set (CORESET).

The blind detection may be performed on the CORESET and the information about the antenna port may be CORESET-specifically configured.

The antenna port used to transmit the control channel of the UE may be changed in every predetermined resource unit and the information about the antenna port may include information about a change pattern of an antenna port changed in every predetermined resource unit.

The change of the antenna port may be UE-specifically performed.

The specific transmit diversity scheme may be 2-antenna port beam cycling and the information about the antenna port may indicate, in every predetermined resource unit, which port of two antenna ports for beam cycling the UE should monitor.

The specific transmit diversity scheme may be determined according to at least one of an aggregation level of the control channel, a control resource set (CORESET) on which the blind detection is performed, and a localized/distributed resource mapping scheme.

Advantageous Effects

According to an embodiment of the present invention, information about partial antenna ports of a BS that a UE should monitor to receive a control channel is signaled so that blind detection complexity of a control channel transmitted through multi-user multiple-input multiple-output (MU-MIMO) is reduced and the UE is multiplexed with other UEs through the other antenna ports so that control channel capacity is improved.

The effects that can be achieved with the present disclosure are not limited to what has been particularly described hereinabove and other advantages of the present disclosure will be more clearly understood from the following detailed description.

BEST MODE FOR CARRYING OUT THE INVENTION

The following description of embodiments of the present disclosure may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, but the technical idea of the present disclosure is not limited thereto. Specific terms used in the following description are provided to provide further understanding of the present disclosure and use of the terms may be modified to other forms within the scope of the present disclosure.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
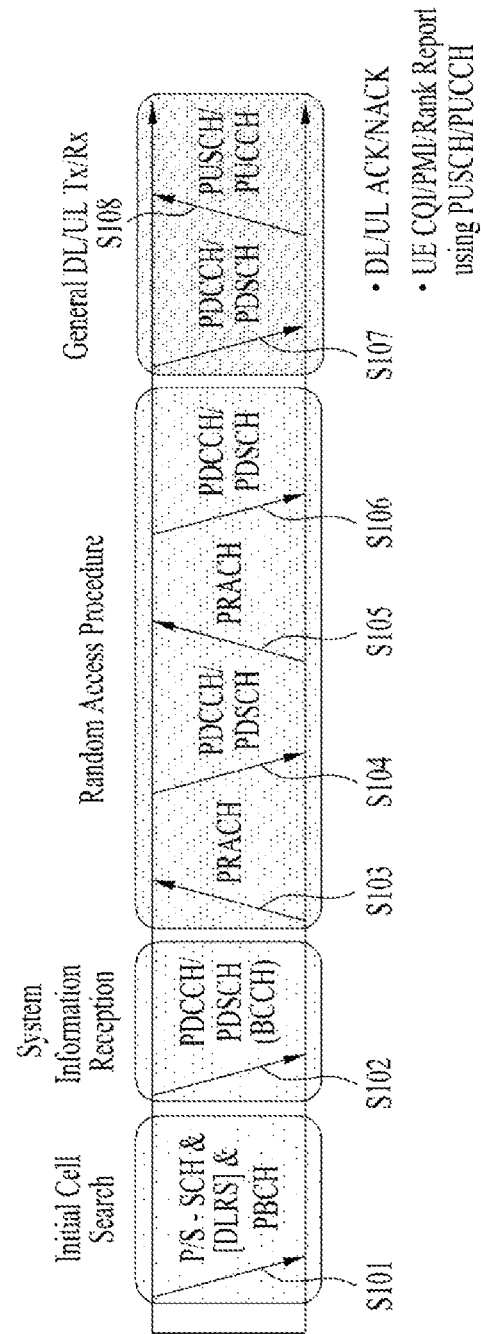
FIG. 1 is a diagram illustrating physical channels used for 3GPP LTE/LTE-A system and a general signal transmission method using the same.

FIG. 1 is a diagram illustrating physical channels used for 3GPP LTE/LTE-A system and a general signal transmission method using the same.

Referring to FIG. 1, if power of a user equipment (UE) is turned on or the UE enters a new cell, the UE may perform an initial cell search operation for matching synchronization with a base station (BS) and the like in operation S101. To this end, the UE may receive a primary synchronization channel (P-SCH) and a secondary synchronization channel (S-SCH) from the BS, may match synchronization with the BS and may then obtain information such as a cell ID and the like. Subsequently, the UE may receive a physical broadcast channel (PBCH) from the BS and may be then able to obtain intra-cell broadcast information. Meanwhile, the UE may receive a downlink reference signal (DL RS) and may be then able to check a DL channel state.

Upon completing the initial cell search, the UE may receive a physical downlink control channel (PDCCH) and a physical downlink shared control channel (PDSCH) according to the physical downlink control channel (PDCCH) in operation S102, thereby obtaining a detailed system information.

Thereafter, the UE may perform a random access procedure to complete access to the BS as in operations S103 to S106. To this end, the UE may transmit a preamble via a physical random access channel (PRACH) (S103) and may then receive a response message on PDCCH and a corresponding PDSCH in response to the preamble (S104). In case of contention-based random access, it may perform a contention resolution procedure such as a transmission (S105) of an additional physical random access channel and a channel reception (S106) of a physical downlink control channel and a corresponding physical downlink shared channel.

Upon performing the above-mentioned procedures, the UE may perform a PDCCH/PDSCH reception (S107) and a PUSCH/PUCCH (physical uplink shared channel/physical uplink control channel) transmission (S108) as a general uplink/downlink signal transmission procedure. Control information transmitted to a BS by a UE may be commonly named uplink control information (UCI). The UCI may include Hybrid Automatic Repeat and reQuest Acknowledgement/Negative-ACK (HARQ-ACK/NACK), Scheduling Request (SR), Channel Quality Indication (CQI), Precoding Matrix Indication (PMI), Rank Indication (RI) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted on PUCCH. Yet, when both control information and traffic data need to be simultaneously transmitted, the UCI may be transmitted on PUSCH. Moreover, the UCI may be non-periodically transmitted in response to a request/indication made by a network.

Figure 2:
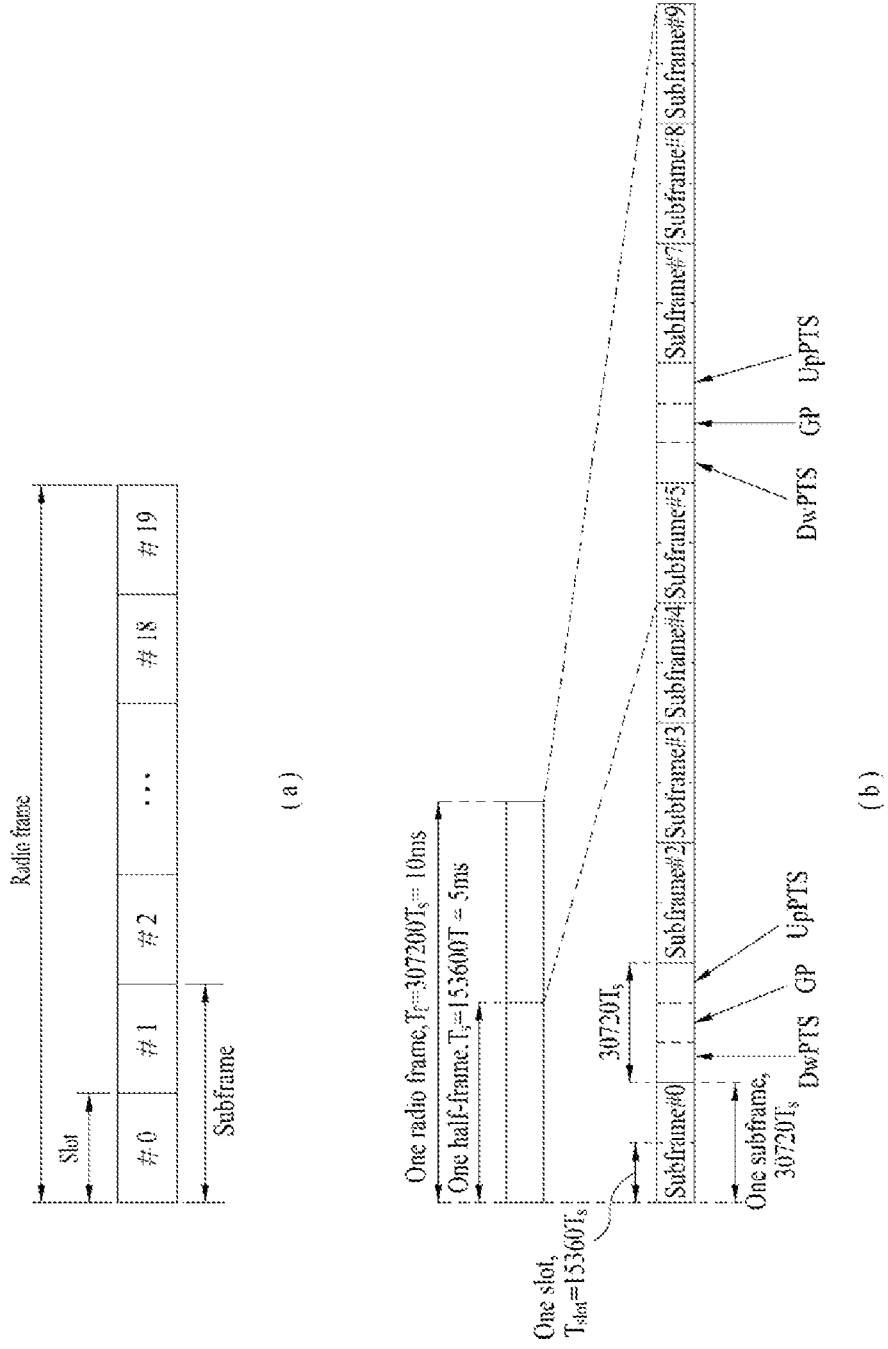
FIG. 2 is a diagram illustrating a structure of a radio frame for 3GPP LTE/LTE-A system.

FIG. 2 is a diagram illustrating a structure of a radio frame. Referring to FIG. 2, UL/DL (uplink/downlink) data packet transmission is performed in a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary according to a configuration of Cyclic Prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a UE. The UpPTS is used for channel estimation in a BS and uplink transmission synchronization of a UE. The guard period is a period for eliminating interference generated in uplink due to multipath delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
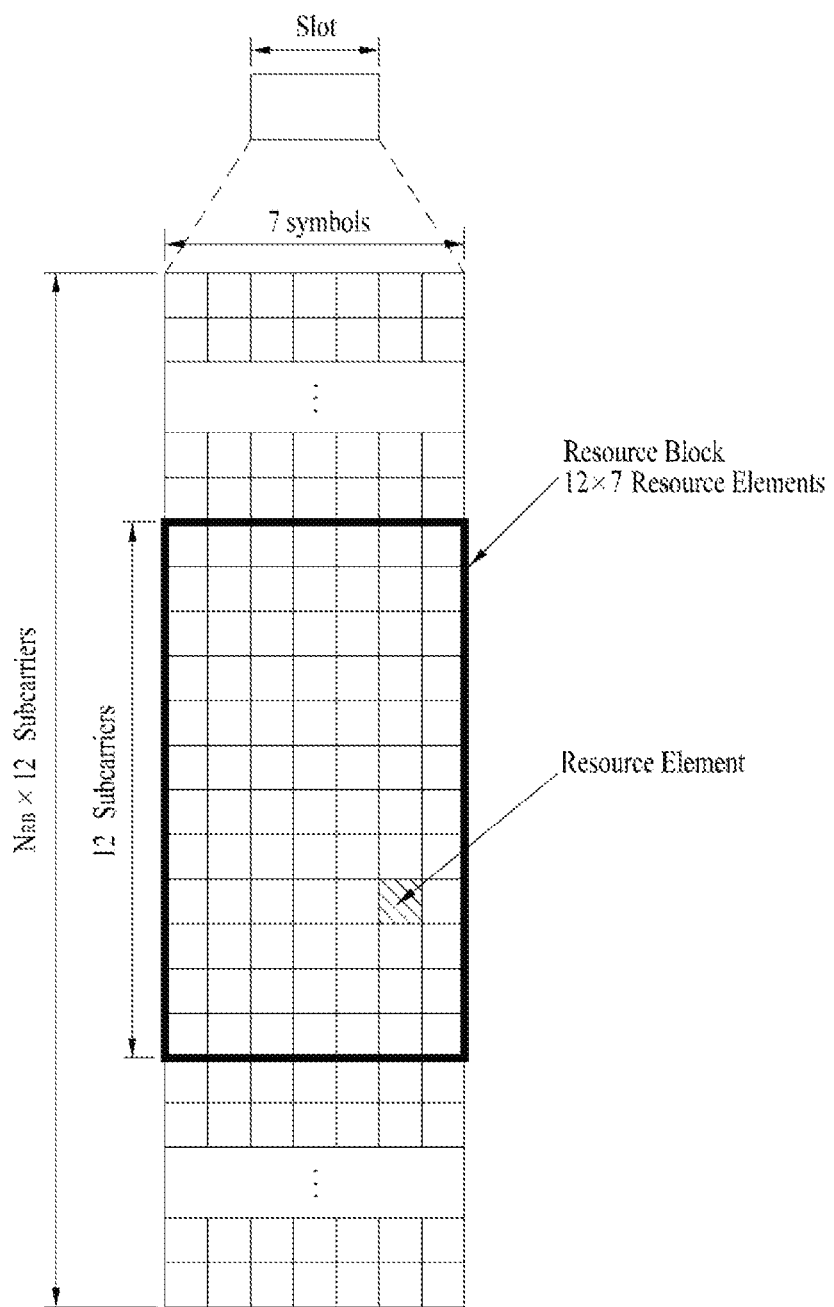
FIG. 3 is a diagram illustrating a resource grid for a downlink slot for 3GPP LTE/LTE-A system.

FIG. 3 is a diagram illustrating a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (RE). One resource block includes 12×7(6) resource elements. The number NRB of resource blocks included in a DL slot may depend on a DL transmission bandwidth. And, the structure of an uplink (UL) slot may be identical to that of the DL slot and OFDM symbol is replaced by SC-FDMA symbol.

Figure 4:
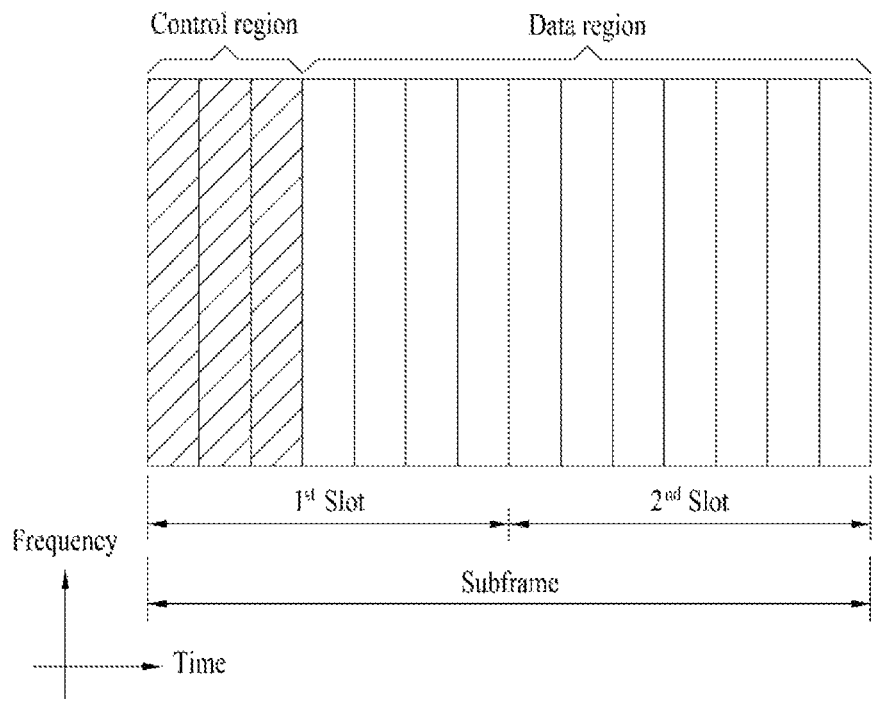
FIG. 4 is a diagram illustrating a structure of a downlink subframe for 3GPP LTE/LTE-A system.

FIG. 4 is a diagram illustrating a structure of a downlink subframe.

Referring to FIG. 4, maximum 3 (4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (TB) or a codeword (CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (DCI). The DCI includes resource allocation information for a UE or a UE group and different control information. For instance, the DCI includes UL/DL scheduling information, UL transmit (Tx) power control command, and the like.

Figure 5:
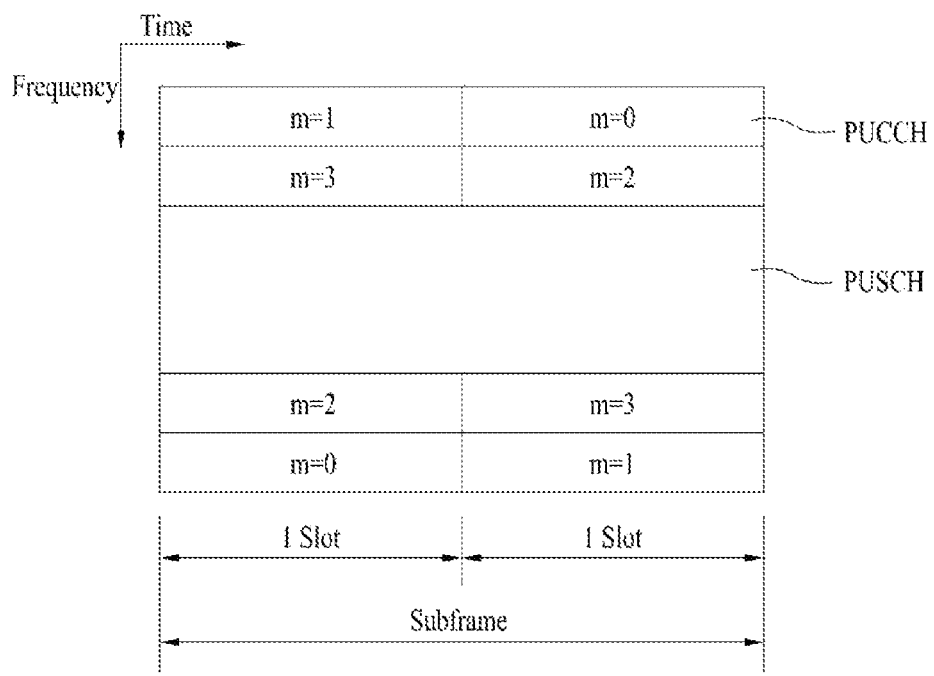
FIG. 5 is a diagram illustrating a structure of an uplink subframe for 3GPP LTE/LTE-A system.

FIG. 5 is a diagram illustrating a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes an RB pair situated at the both ends of the data region on a frequency axis and hops on a slot boundary.

The PUCCH can be used for transmitting control information such as SR (Scheduling Request), HARQ-ACK and/or CSI (Channel State Information).

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
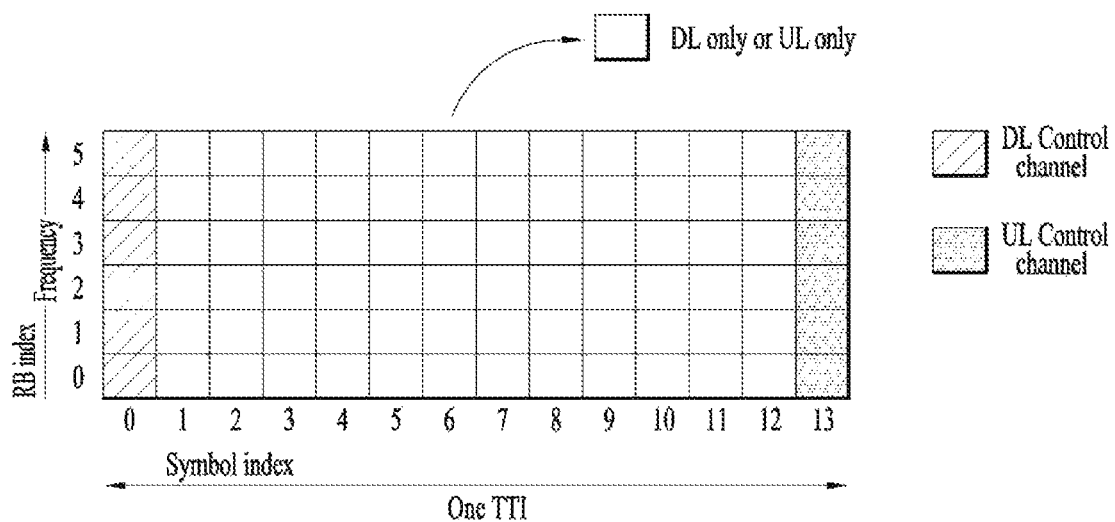
FIG. 6 is a diagram illustrating a structure of a self-contained subframe according to one embodiment of the present disclosure.

FIG. 6 is a diagram illustrating a structure of a self-contained subframe according to one embodiment of the present disclosure.

According to a TDD-based self-contained subframe structure, both a resource region for DL and a resource region for UL (e.g., DL and UL control channels) exist in one subframe.

In FIG. 6, hatched areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized As described above, the expression "Self-Contained" may cover that a response (ACK/NACK) to DL or UL transmitted within the corresponding subframe is received within the corresponding subframe. However, since the time of one subframe or more may be required for transmission and response according to processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows a BS and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present disclosure is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
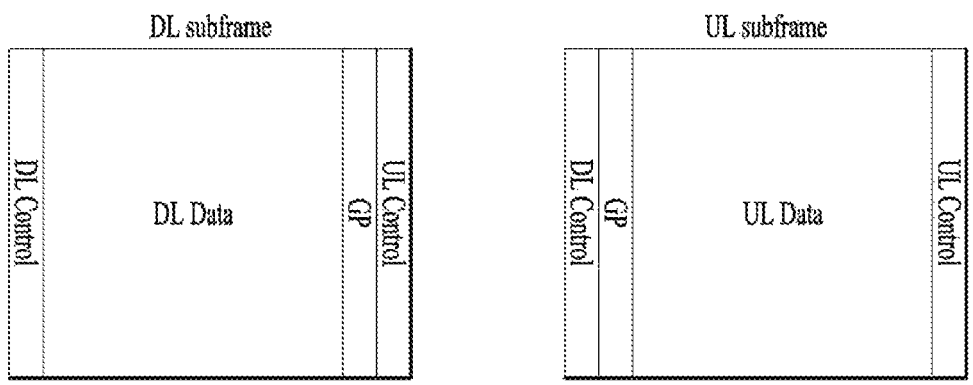
FIG. 7 is a diagram illustrating a downlink self-contained subframe and an uplink self-contained subframe according to one embodiment of the present disclosure.

FIG. 7 is a diagram illustrating a DL subframe and a UL subframe according to one embodiment of the present disclosure.

Referring to FIG. 7, the GP is located at the time when DL is switched to UL. For example, the GP is located between the DL data region and the UL control region at the DL subframe and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

NR Control Channel

In the NR system, a unit forming the basis of transmission of a control channel may be defined as a NR-resource element group (REG) and/or a NR-control channel element (CCE).

The NR-REG may correspond to one OFDM symbol in the time domain and one physical resource block (PRB) in the frequency domain. One PRB may correspond to 12 subcarriers, and one CCE may correspond to 6 REGs.

Hereinafter, a control resource set (CORESET) and a search space (SS) will be described in brief. The CORESET may be a set of resources for control signal transmission, and the SS may be a set of candidate control channels which a UE performs blind detection for. The SS may be configured in the CORESET. For example, assuming that one SS is defined in one CORESET, CORESETs may be defined for a common search space (CSS) and a UE-specific search space (USS), respectively. As another example, multiple SSs may be defined in one CORESET. For example, the CSS and USS may be configured in the same CORESET. In the following description, a CSS may mean a CORESET in which the CSS is configured, and a USS may mean a CORESET in which the USS is configured.

A BS may transmit information on a CORESET to a UE. For example, the CORESET configuration of each CORESET and the time duration (e.g., 1, 2, or 3 symbols) thereof may be signaled. When interleaving is applied to a 1-symbol CORESET for CCE distribution, 2 or 6 REGs may be bundled. In the case of a 2-symbol CORESET, 2 or 6 REGs are bundled and time-first mapping may be applied. In the case of a 3-symbol CORESET, 3 or 6 REGs are bundled and time-first mapping may be applied. When REG bundling is performed, a UE may assume that the same precoding is applied to a corresponding bundling unit.

TX Schemes for NR Control Channel

First, a control channel transmission scheme of an LTE (-A) system will now be described in brief. In the case of a PDCCH of the LTE system, a transmit diversity scheme based on space frequency block coding (SFBC) has been introduced to improve decoding performance of the control channel. In the case of an enhanced physical downlink control channel (EPDCCH) of the LTE system, the BS has performed UE-dedicated beamforming based on feedback of the UE or used an RE-level beam cycling scheme using 2-antenna port (hereinafter, a 'port') as the transmit diversity scheme. In regard to the transmit diversity scheme of the EPDCCH, although SFBC has excellent performance relative to RE-level beam cycling, 2-port RE-level cycling has been introduced as the transmit diversity scheme of the EPDCCH due to an SFBC pairing problem generated by the number of demodulation reference signal (DMRS) REs and a CSI-RS configuration. The LTE specification specifies that SFBC cannot be used when two REs constituting an SFBC pair are separated by two or more subcarriers or when the number of REs in which SFBC pairing is performed in one symbol and one RB is an odd number.

In a DL control channel of NR, the above-mentioned SFBC pairing problem may not be generated (by definition of an RS pattern) and various transmit diversity schemes may be considered.

The present disclosure proposes a transmit diversity scheme capable of being used for an NR DL control channel (hereinafter, 'NR-PDCCH') and describes information needed to use each transmit diversity scheme. In addition, a configuration of each resource mapping scheme (e.g., localized/distributed mapping) when each transmit diversity scheme is used is described.

Meanwhile, indexes for distinguishing between sections and examples to be described below are for convenience of description. Each section and example do not always constitute different inventions and a combination of sections and examples to which different indexes are assigned may be implemented as one invention.

A. Transmit Diversity Scheme for NR-PDCCH

In examples to be described later, when plural ports are present, a multiplexing method between the ports is not limited to frequency divisional multiplexing (FDM) and may be multiplexed based on, for example, code division multiplexing (CDM) on the same resource.

EXAMPLE A-1

Space Frequency Block Code (SFBC)

SFBC exhibits excellent performance relative to other transmit diversity schemes on the whole. Particularly, when SFBC is used on a control channel, SFBC may expect excellent performance at a low aggregation level (e.g., high coding rate). However, since SFBC gain is lowered when the distance between two REs constituting an SFBC pair is long in the frequency domain, REs constituting the SFBC pair need to be adjacently deployed.

In an NR-PDCCH, feedback-based beamforming of the UE may be introduced. Herein, since multi-layer (or multi-rank) transmission of the NR-PDCCH may increase decoding complexity of the UE, 1-port beamforming may be desirable.

Thus, if a UE-dedicated beamforming (e.g., 1-port beamforming) is introduced for the NR-PDCCH, it is necessary to distinguish between 1-port UE-dedicated beamforming and 2-port SFBC due to the difference in the number of ports and the difference in a decoding scheme. In addition, a transmission scheme (e.g., 2-port SFBC or 1-port UE-dedicated beamforming) that the UE should assume by the UE with respect to each CORESET or each search space may be configured through higher layer signaling or broadcast signaling. For example, when both a 2-port transmit scheme such as SFBC and 1-port UE-dedicated beamforming are supported for control channel transmission, a network may signal the number of ports or a transmission scheme that should be assumed during blind decoding, to the UE based on each resource unit such as a CORESET set.

As mentioned previously, a CORESET is a resource region in which resource group (e.g., REG or CCE) indexing constituting a search space is performed and a single CORESET or plural CORESETs may be signaled to the UE (or UE-group).

When SFBC is introduced, the number of RS ports of the NR-PDCCH may be defined as 2. In this case, MU-MIMO of 1-port UE-dedicated beamforming may be implemented using two orthogonal RS ports. Herein, an assumption that (i) an RS port is designated for each UE, or (ii) a search space of each UE is configured for all RS ports (e.g., the UE performs blind detection for all ports) needs to be made.

As an example of (i), when the network uses both a 1-port transmit scheme and a 2-port transmit scheme and an RS is fixed as 2-port transmission, the network may signal which port will be used to the UE that assumes the 1-port transmit scheme. For example, when Port #0 and Port #1 are orthogonal, Port #0 may transmit an NR-PDCCH for UE 1 through a 1-port UE-dedicated beamforming scheme and Port #1 may transmit an NR-PDCCH for UE 2 through a 1-port UE-dedicated beamforming scheme. Therefore, the NR-PDCCH of UE 1 and the NR-PDCCH of UE 2 may be transmitted through an MU-MIMO scheme. In this way, MU-MIMO between UEs receiving the NR-PDCCH through the 1-port transmit scheme may be performed using two ports and, to this end, the network may instruct each UE to attempt to detect a control channel using a specific port.

As an example of (ii), when all of 2 ports are used to configure a search space, the network may signal an aggregation level (AL) and the number of control channel candidates, that should be assumed per port, to the UE. This is advantages in that scheduling flexibility of the network is increased.

When it is desired to implement MU-MIMO between transmit diversity schemes (e.g., NR-PDCCHs of different UEs to which a specific transmit diversity scheme is applied are multiplexed), the network may signal an RS scrambling parameter of each port, that may be assumed when SFBC decoding is performed, to each UE (or UE-group). Since each of UEs uses a different scrambling sequence generated through a different RS scrambling parameter, multiple users may be multiplexed on the same resource even in a transmit diversity scheme. That is, multiplexing in the transmit diversity scheme may be implemented using a non-orthogonal MU-MIMO scheme. This is characteristic in that MU-MIMO of the transmit diversity scheme is implemented by scrambling and, in this case, scrambling is differently configured for each UE (or UE group).

EXAMPLE A-2

1-Port RB-Level Beam Cycling (the Number of RS Ports=1)

Figure 8:
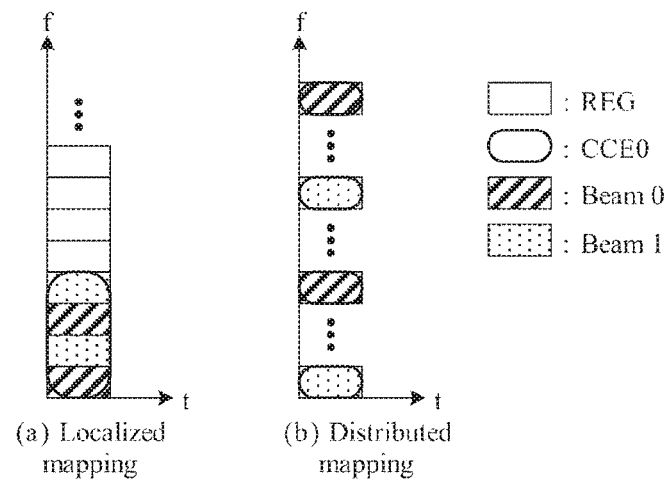
FIG. 8 illustrates resource mapping and beam configuration, for 1-port RB-level beam cycling, according to an embodiment of the present invention.

FIG. 8 illustrates resource mapping and beam configuration, for 1-port RB-level beam cycling, according to an embodiment of the present invention.

A beam used for beam cycling may be selected by the network. As an example, in FIG. 8, the network may configure Beam 0 and Beam 1 as beams orthogonal to each other, thereby raising transmit diversity gain.

Alternatively, a beam used for beam cycling may be determined based on feedback of the UE. For example, if the UE reports a plurality of preferred beams based on CSI measurement in a PDSCH or PDCCH region, the network may use a part of reported beams for a transmit diversity scheme.

If 1-port UE-dedicated beamforming is introduced and if 1-port RB-level beam-cycling is introduced as the transmit diversity scheme, since each transmit scheme uses the same decoding scheme in terms of the UE, complexity may be reduced. Even in terms of the network, since additional signaling is not needed, there is an advantage of reducing signaling overhead. Since the number of RS ports 1, the network may obtain channel estimation gain by increasing the number of REs of a 1-port RS or obtain coding gain by increasing the number of data REs, as compared with 2-port transmission.

If it is desired to implement MU-MIMO for 1-port UE-dedicated beamforming, since the number of RS ports is 1, there is a disadvantage that orthogonal MU-MIMO cannot be implemented. For MU-MIMO, the network should signal an RS scrambling parameter such as a virtual cell ID to each UE (or each UE group). In the above description, 1-port RB-level beam-cycling and 1-port UE-dedicated beamforming could be UE-transparently performed. However, if MU-MIMO is introduced for UE-dedicated beamforming and a UE-specific (UE group-specific) RS scrambling parameter is introduced for MU-MIMO, a transmit scheme may not be UE-transparent according to an RS scrambling parameter assumed in the transmit diversity scheme. For example, if a used RS scrambling parameter differs according to each transmit scheme, the network cannot UE-transparently change the transmit scheme.

As an example, if it is desired to implement MU-MIMO between transmit diversity schemes, the network may signal an RS scrambling parameters that may be assumed when NR-PDCCH decoding is performed to each UE (or each UE group). Accordingly, even if MU-MIMO is introduced, UE transparency may be maintained. Specifically, a UE-specific (or UE group-specific) RS scrambling parameter may be introduced so that both MU-MIMO for 1-port UE-dedicated beamforming and MU-MIMO for 1-port RB-level beam-cycling may be performed. Then, the UE may perform decoding without discriminating between transmission schemes. Accordingly, the network may change UE-transparently the transmit scheme.

Such transparency may be guaranteed only for a UE-specific search space (USS). When both UE-dedicated beamforming and transmit diversity scheme are supported in the USS, a UE-specific RS scrambling parameter to be used in the USS is signaled, so that transparency may be guaranteed.

Meanwhile, a common scrambling parameter (e.g., a cell ID) may be used in a CSS. Therefore, the UE may assume different RS scrambling parameters according to a search space type. The UE may also assume that only a transmit diversity scheme is used in the CSS.

EXAMPLE A-3

1-Port RB-Level Beam-Cycling (the Number of RS Ports=2)

Considering the scheme of Example A-3 in terms of a single UE, the UE may operate as in Example A-2. However, since the number of RS ports is increased to 2 in Example A-3, UEs may be multiplexed using orthogonal ports during MU-MIMO. The UE may assume that control information is not transmitted on a resource on which a 2-port RS is transmitted. For example, although only one port is actually used for one UE, the UE may assume that a control channel is rate-matched for all of two ports.

For orthogonal MU-MIMO, the network may signal which port is used for each UE (or each UE group) to blind-decode an NR-PDCCH. As such, it is possible to perform MU-MIMO between UEs assuming 1-port UE-dedicated beamforming. The network may provide each UE with configuration regarding a port that should be assumed, an AL to be applied to each port, and the number of NR-PDCCH candidates allied to each port. For example, assuming that the total number of NR-PDCCH candidates that the UE can blind-decode is N, the network may instruct the UE to blind-decode K(<N) NR-PDCCH candidates with respect to a first port and instruct the UE to blind-decode N-K NR-PDCCH candidates with respect to a second port. The network may also instruct the UE to detect NR-PDCCH candidates corresponding to first and second ALs with respect to the first port and instruct the UE to detect NR-PDCCH candidates corresponding to third and fourth ALs with respect to the second port. Herein, an AL per port is not necessarily exclusive and the network may individually designate an AL with respect to a port. This signaling method will be described later in Section B. Configurability of port allocation.

EXAMPLE A-4

2-Port RB-Level Port-Cycling

Figure 9:
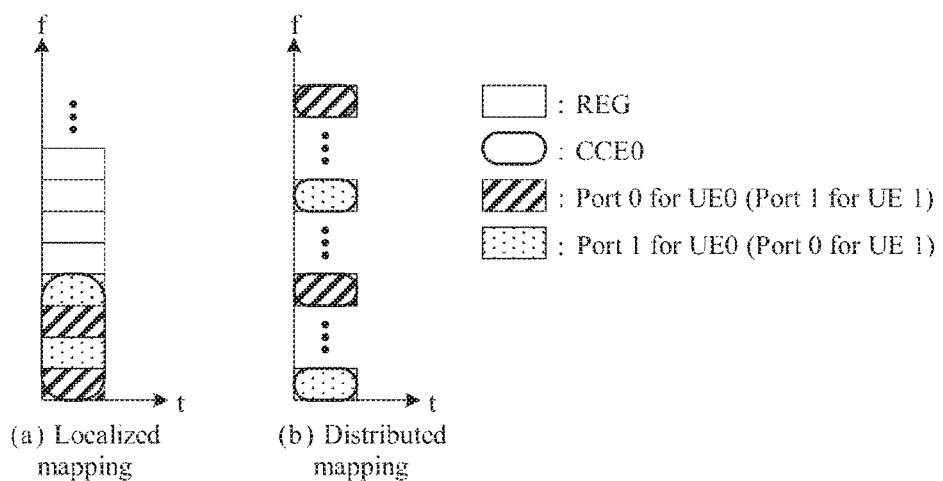
FIG. 9 illustrates a 2-port RB-level port-cycling scheme according to an embodiment of the present invention.

FIG. 9 illustrates a 2-port RB-level port-cycling scheme. FIG. 9 may be interpreted as 2-port RB-level beam-cycling. For example, two ports may form different beams to implement a transmit diversity scheme. In the following description, a port may be interpreted as a port to which a different beam is applied. Such a scheme may be a scheme of decoding resources corresponding to Beam 0 and Beam 1 of FIG. 8 using Port 0 and Port 1, respectively.

Two ports used for 2-port RB-level port-cycling may be present in each of all PRBs. In this case, the UE may assume that PRB bundling may be performed for a plurality of PRBs present within a coherent frequency region (or a plurality of PRBs present in a PRB bundling duration which is signaled by the network or is predefined). The network may signal (e.g., through higher layer signaling or broadcast signaling) that it may be assumed that the same precoding is applied to the same port which is present in adjacent RBs (or PBs which are present in a PRB bundling size) to the UE or predefine such an assumption. Alternatively, when the network does not guarantee that the same precoding is applied to the same port included in adjacent RBs, the UE may decode a control channel by performing channel estimation per RB.

If it is desired to perform MU-MIMO for a transmit diversity scheme, an RS port pattern of each of multiplexed UEs may be differently configured. For example, in a localized mapping case of (a) of FIG. 9, the network may signal, to a first UE, that it will assume that port 0, port 1, port 0, and port 1 are sequentially allocated to four RBs and signal, to a second UE, that it will assume that port 1, port 0, port 1, and port 0 are sequentially allocated to four RBs. In this way, MU-MIMO may be performed using a port mapping pattern and the network may signal a port pattern that the UE should assume to each UE. Although each UE monitor one port per RB, two ports are present in each RB in terms of the network.

When RS ports are FDMed, the network may perform orthogonal MU-MIMO for a transmit diversity scheme by signaling RS port patterns for RBs.

EXAMPLE A-5

2-Port RE-Level Beam-Cycling

According to the transmit diversity scheme of Example A-2, A-3 and/or A-4 described above, since there is no spatial diversity gain in one RB, diversity gain caused by beam (or port) cycling in the case in which distributed mapping is used may be reduced. To obtain spatial diversity gain in an RB, beam-cycling may be performed within one RB. For example, a different beam may be applied to each RE belonging to the same RB.

RE-level beam cycling has been applied to distributed mapping of an EPDCCH of LTE.

Meanwhile, in 2-port RE-level beam-cycling of the present embodiment, an RS port pattern per RE may be differently configured for each UE or each UE group in order to implement MU-MIMO between transmit diversity schemes. This may be interpreted as the application of an RS port pattern per RB to REs in an RB in Example A-4. For example, the first UE may assume that ports 0, 1, 0, and 1 have been sequentially allocated to 4 REs in one RB and assume that the same precoding is applied to each port. In addition, the second UE may assume that ports 1, 0, 1, and 0 have been sequentially allocated to 4 REs in one RB and assume that the same precoding is applied to each port. An RS port mapping pattern for an RE may be signaled by the network or may be predefined.

Table 1 shows characteristics of the transmit diversity schemes of the NR-PDCCH described above.

TABLE 1

| | UE transparency | Spatial diversity in a PRB | MU-MIMO for 1-port transmission | Orthogonal MU-MIMO for transmit diversity | NR-PDCCH capacity | Spec. impact | Etc. |
|---|---|---|---|---|---|---|---|
| 2-ports SFBC | No | Yes | Orthogonal and/or non-orthogonal | No | Medium | Tx scheme assignment for each CORESET or SS | RS FDM → 3 dB power boosting |
| 1-port BC with 1-port | Yes | No | Non-orthogonal | No | Low | No | No power boosting, coding gain |
| 1-port BC with 2-ports | No | No | Orthogonal and/or non-orthogonal | Yes | High | Port allocation for each UE | RS FDM → 3 dB power boosting |
| 2 ports PC (RB level) | No | No | Orthogonal and/or non-orthogonal | Yes | High | Port allocation for each RB for each UE | RS FDM → 3 dB power boosting |
| 2-ports BC (RE level) | No | Yes | Orthogonal and/or non-orthogonal | Yes | High | Port allocation for each RE for each UE | RS FDM → 3 dB power boosting |

B. Configurability of Port Allocation

In the transmit diversity schemes described in Example A-3, A-4, and/or A-5, an entity or a resource unit to which an RS port is applied may differ according to example. Thus, MU-MIMO may be performed on a resource to which a transmit diversity scheme is applied through different RS port allocation and, therefore, control channel capacity may be improved in terms of the network.

Hereinafter, detailed examples of allocating an RS port will be described. In some case, port allocation may be interpreted as allocation of a beam type or index that the UE assumes.

An RS port pattern proposed below may be applied in a control channel candidate unit of the UE or in a CORESET unit. For example, in the scheme (e.g., Example A-2/A-3/A-4) in which a port or a beam is changed in an RB unit, if change of the port or the beam is applied in a control channel candidate unit, the UE may enumerate RB(s) constituting a specific candidate in the logical domain and assume that a pattern of the port or the beam is sequentially applied to the enumerated RB(s).

Meanwhile, if a port or beam pattern is changed in a CORESET, the UE may sequentially apply the port or beam pattern to RBs in the CORESET and assume a port or beam defined at a CORESET level in each RB constituting a candidate.

EXAMPLE B-1

RS port allocation assumed by each UE may be determined based on a UE ID etc.

As an example, RS port allocation that each UE should assume may be determined by performing a Modulo operation for the UE ID by the number of allocable RS ports (e.g., UE ID MOD (total number of RS ports)). In the case of Example A-4: 2-port RB-level port cycling, when pattern 1 of ports 0, 1, 0, and 1 and pattern 2 of ports 1, 0, 1, and 0 are present in adjacent RBs, UEs having even-numbered UE IDs may be predefined to use pattern 1 and UEs having odd-numbered UE IDs may be predefined to use pattern 2.

EXAMPLE B-2

The UE may perform blind decoding for all port or beam patterns.

If there are plural port or beam patterns, the UE may perform blind decoding for all cases. Since the number of blind decoding attempts of the UE will greatly increase, the total number N of blind decoding attempts may be distributed to each pattern in a state in which the total number N of blind decoding attempts that a corresponding UE should perform is fixed.

As a method of distributing the number of blind decoding attempts, the number of blind decoding attempts configured in a corresponding CORESET or a corresponding search space set may be equally distributed. Alternatively, the number of blind decoding attempts per port may be signaled by the network.

If the total number of blind decoding attempts is an odd number, the number of blind decoding attempts larger by one may be allocated to a specific port determined by a UE ID etc.

The number of blind decoding attempts mentioned above may imply an AL at which blind decoding should be performed and the number of candidates per AL. For example, k candidates of a first AL and m candidates of a second AL may be allocated to a first port/beam and m candidates of a third AL and 1 candidates of a third AL may be allocated to a second port/beam.

EXAMPLE B-3

The network may signal a port or beam pattern per UE (or UE group) through a common control channel. For example, the network may transmit a port or beam pattern of an NR PDCCH to be transmitted in a USS through an NR PDCCH in a CSS. This is favorable to improve scheduling flexibility in terms of the network.

In the case of the common control channel, a fixed port or beam pattern may be predefined.

The above-proposed signaling scheme of an RS port or beam pattern may be applied only to a specific resource unit. For example, a different RS port or beam pattern may be applied to each resource unit.

For example, a plurality of CORESETs using the transmit diversity scheme may be configured and information signaled for each CORESET may be differently configured. For example, the UE assumes that a fixed port or beam pattern is used in a CORESET (or search space) for transmitting common control information. In the CORESET (or search space) for transmitting UE-specific control information, a port or beam pattern may be determined by network signaling.

C. Transmit Diversity Scheme Selection for NR-PDCCH

The above-proposed transmit diversity schemes may have different characteristics. Therefore, according to an example of the present invention, the network may support a plurality of transmit diversity schemes and use a different transmit diversity scheme according to each situation, thereby improving overall control channel performance.

EXAMPLE C-1

AL-Specific Transmit Diversity Scheme

An AL exhibiting optimal performance may differ according to a transmit diversity scheme. For example, an SFBC scheme exhibits excellent performance relative to a beam cycling scheme as coding rate is high (e.g., at a low AL), in other words, as the difference between the number of information bits and the number of encoded bits is small. The beam-cycling scheme may exhibits relatively good performance when coding rate is low.

Accordingly, for optimal performance, the UE may assume a different transmit diversity scheme per AL. A transmit diversity scheme applied per AL may be predefined (e.g., SFBC for ALs 1 and 2 and RB-(RE-)level beam-cycling for ALs 4 and 8) or a transmit diversity scheme that the UE should assume per AL may be signaled to the UE by the network.

As described above, if the transmit diversity scheme per AL is signaled by the network, the transmit diversity scheme per AL may be UE-specifically (or UE-group-specifically) configured.

EXAMPLE C-2

CORESET-Specific Transmit Diversity Scheme

The network may signal to the UE to assume a different transmit diversity scheme per CORESET.

Example C-2 may be implemented in association with Example C-1. For example, the network may signal a transmit diversity scheme per AL (Example C-1) and signal a transmit diversity scheme per CORESET (Example C-2). The UE may perform the transmit diversity scheme of a corresponding CORESET and blind decoding only for a candidate of an AL associated with the transmit diversity scheme.

EXAMPLE C-3

Resource Mapping-Specific Transmit Diversity Scheme

A transmit diversity scheme used in corresponding resource mapping may be determined according to a resource mapping scheme. For example, a localized mapping scheme may be predefined to use 1-port RB level beam-cycling (in this case, the number of RS ports may be 1 or 2) and a distributed mapping scheme may be predefined to use 2-port SFBC. Alternatively, the network may signal a transmit diversity scheme to be used per resource mapping scheme to the UE.

As mentioned above, SFBC exhibits better performance than beam cycling in most situations including a low AL. Meanwhile, if localized mapping is implemented, a diversity scheme using a plurality of beams in a narrowband may exhibit excellent performance. In addition, even if a 1-port beam-cycling scheme is used together with a 1-port UE-dedicated beamforming scheme, since change of a transmit scheme is transparent in terms of the UE, scheduling flexibility of the network may be improved in a localized resource mapping region.

For example, if load is small in the localized resource mapping region and channel information of a specific UE is inaccurate, the network may transmit control information to the UE using a transmit diversity scheme in the localized resource mapping region. Therefore, in this case, in the localized resource mapping region (e.g., CORESET defined to use localized mapping), the transmit diversity scheme and the UE-dedicated beamforming scheme are UE-transparently used and, in the distributed resource mapping region, another transmit diversity scheme may be used.

Figure 10:
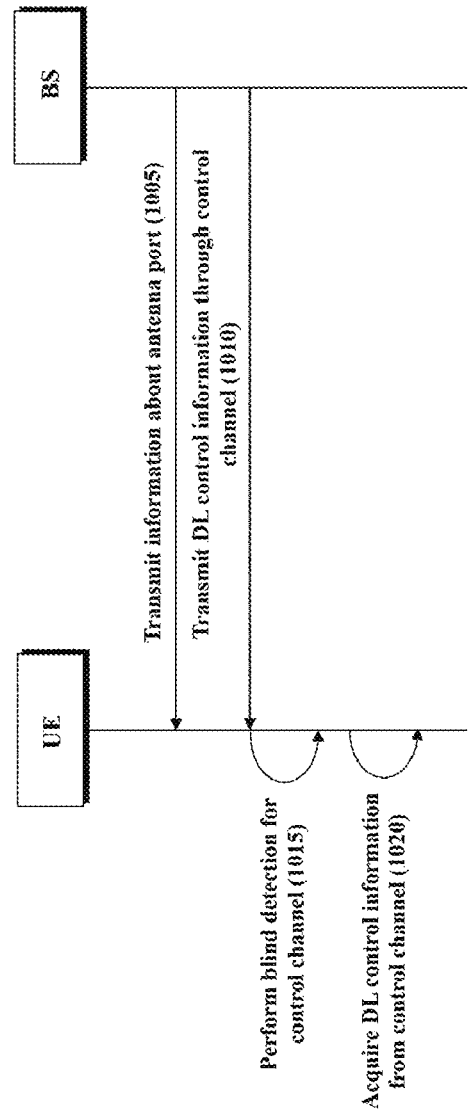
FIG. 10 is a flowchart illustrating a control channel transmission and reception method according to an embodiment of the present invention.

FIG. 10 is a flowchart illustrating a DL control information transmission and reception method according to an embodiment of the present invention. A repetitive part of the above description may be omitted.

Referring to FIG. 10, a UE receives information about an antenna port from a BS (1005). The information about the antenna port may indicate at least one antenna port that the UE needs to monitor among a plurality of antenna ports used by the BS for control channel transmission.

The BS transmits a control channel carrying DL control information of the UE based on the information about the antenna port (1010).

The UE performs blind detection for the control channel based on the information about the antenna port (1015). In performing blind detection, the UE may assume that a specific transmit diversity scheme is applied to at least one antenna port indicated through the information about the antenna port.

The UE acquires DL control information carried by the control channel through blind detection (1020).

Plural antenna ports are orthogonal and other antenna ports except for the at least one antenna port used to transmit the control channel of the UE may be used to transmit control channels of other UEs to which the specific diversity scheme is applied. The control channels of the other UEs and the control channel of the UE may be multiplexed on the same CORESET.

The blind detection may be performed on the CORESET and the information about the antenna port may be CORESET-specifically configured.

The antenna port used to transmit the control channel of the UE may be changed in every predetermined resource unit and the information about the antenna port may include information about a change pattern of an antenna port changed in every predetermined resource unit.

The change of the antenna port may be UE-specifically performed.

The specific transmit diversity scheme may be 2-antenna port beam cycling and the information about the antenna port may indicate, in every predetermined resource unit, which port of two antenna ports for beam cycling the UE needs to monitor.

The specific transmit diversity scheme may be determined according to at least one of an aggregation level of the control channel, a CORESET on which blind detection is performed, and a localized/distributed resource mapping scheme.

Figure 11:
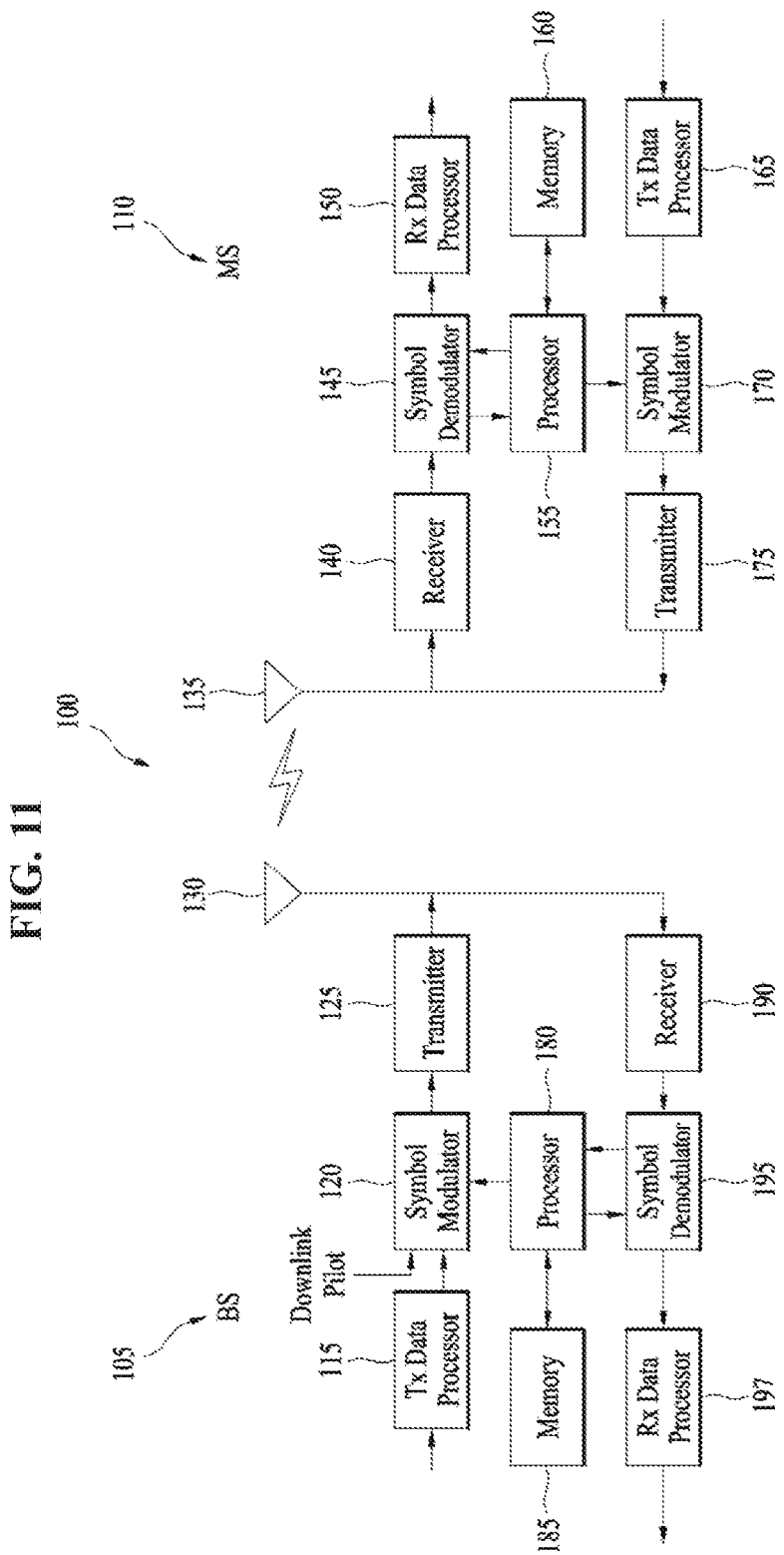
FIG. 11 is a block diagram illustrating a user equipment and a base station according to an embodiment of the present disclosure.

FIG. 11 is a block diagram illustrating the configuration of a BS 105 and a UE 110 in a wireless communication system 100 according to an embodiment of the present disclosure.

While one BS 105 and one UE 110 are shown in the drawing to schematically represent the wireless communication system 100, the wireless communication system 100 may include at least one BS and/or at least one UE.

The BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS 105/UE 110 are illustrated as including one antenna 130, 135, each of the BS 105 and the UE 110 includes a plurality of antennas. Therefore, each of the BS 105 and the UE 110 of the present disclosure supports a multiple input multiple output (MIMO) system. And, the BS 105 according to the present disclosure may support both the single user-MIMO (SU-MIMO) system and the multi user-MIMO (MU-MIMO) system.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In this operation, each of the transmitted symbols may include the data symbol, the pilot symbol or a signal value of zero. In each symbol duration, pilot symbols may be contiguously transmitted. In this operation, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the UE via the antenna 130.

In the configuration of the UE 110, the receiving antenna 135 receives the downlink signal from the BS and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the BS 105, respectively.

In the UE 110 on uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the BS 105 via the antenna 135.

In the BS 105, the uplink signal is received from the UE 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the UE 110.

The processor 155/180 of the UE 110/BS 105 directs operations (e.g., control, adjustment, management, etc.) of the UE 110/BS 105. The processor 155/180 may be connected to the memory unit 160, 185 configured to store program codes and data. The memory 160, 185 is connected to the processor 155, 180 to store operating systems, applications and general files.

The processor 155, 180 may be called one of a controller, a microcontroller, a microprocessor, a microcomputer and the like. And, the processor 155, 180 may be implemented using hardware, firmware, software and/or any combinations thereof. In the implementation by hardware, the processor 155, 180 may be provided with such a device configured to implement the present disclosure as application specific integrated circuits (ASICs), digital signal processors (DSPs), digital signal processing devices (DSPDs), programmable logic devices (PLDs), field programmable gate arrays (FPGAs), and the like.

In case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155, 180 or stored in the memory 160, 185 so as to be driven by the processor 155, 180.

Layers of a radio protocol between a UE/BS and a wireless communication system (network) may be classified into 1st layer L1, 2nd layer L2 and 3rd layer L3 based on 3 lower layers of open system interconnection (OSI) model well known to communication systems. A physical layer belongs to the 1st layer and provides an information transfer service via a physical channel Radio resource control (RRC) layer belongs to the 3rd layer and provides control radio resourced between UE and network. A UE and a BS may exchange RRC messages with each other through a wireless communication network and RRC layers.

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present disclosure has been described and illustrated herein with reference to the preferred embodiments thereof, it will be apparent to those skilled in the art that various modifications and variations can be made therein without departing from the spirit and scope of the invention. Thus, it is intended that the present disclosure covers the modifications and variations of this invention that come within the scope of the appended claims and their equivalents.

INDUSTRIAL APPLICABILITY

As described above, the present disclosure is applicable to various wireless communication systems.

What is claimed is:

1. A method of receiving downlink control information from a base station (BS) by a user equipment (UE) in a wireless communication system, the method comprising:
  receiving information about an antenna port from the BS;
  performing blind detection for a control channel based on the information about the antenna port; and
  acquiring downlink control information carried by the control channel through the blind detection,
  wherein the information about the antenna port indicates at least one antenna port that the UE should monitor among a plurality of antenna ports used by the BS for control channel transmission,
  wherein the UE assumes that a specific transmit diversity scheme is applied to the at least one antenna port indicated by the information about the antenna port in performing the blind detection,
  wherein the antenna port used to transmit the control channel of the UE is changed in every control resource set (CORESET) and the information about the antenna port includes information about a change pattern of an antenna port changed in the every CORESET, and the change pattern is determined by performing a Modulo operation for a UE identification (ID) by a number of the at least one antenna port, and
  wherein the specific transmit diversity scheme is determined based on at least one of an aggregation level of the control channel, or a localized/distributed resource mapping scheme.

2. The method of claim 1, wherein the plural antenna ports are orthogonal and other antenna ports except for the at least one antenna port used to transmit the control channel of the UE are used to transmit control channels of other UEs to which the specific diversity scheme is applied.

3. The method of claim 2, wherein the control channels of the other UEs and the control channel of the UE are multiplexed on the same CORESET.

4. The method of claim 3, wherein the blind detection is performed on the CORESET and the information about the antenna port is CORESET-specifically configured.

5. The method of claim 1, wherein the change of the antenna port is UE-specifically performed.

6. The method of claim 1, wherein the specific transmit diversity scheme is 2-antenna port beam cycling and the change pattern indicates, in each resource unit of the CORESET, which port of two antenna ports for beam cycling the UE should monitor.

7. A method of transmitting downlink control information to a user equipment (UE) by a base station (BS) in a wireless communication system, the method comprising:
  transmitting information about an antenna port to the UE; and transmitting a control channel carrying downlink control information of the UE based on the information about the antenna port, wherein the information about the antenna port indicates at least one antenna port that the UE should monitor among a plurality of antenna ports used by the BS for control channel transmission, wherein the BS applies a specific transmit diversity scheme to at least one antenna port indicated by the information about the antenna port, wherein the antenna port used to transmit the control channel of the UE is changed in every control resource set (CORESET) and the information about the antenna port includes information about a change pattern of an antenna port changed in the every CORESET, and the change pattern is determined by performing a Modulo operation for a UE identification (ID) by a number of the at least one antenna port, and wherein the specific transmit diversity scheme is determined based on at least one of an aggregation level of the control channel, or a localized/distributed resource mapping scheme.

8. The method of claim 7, wherein the plural antenna ports are orthogonal and other antenna ports except for the at least one antenna port used to transmit the control channel of the UE are used to transmit control channels of other UEs to which the specific diversity scheme is applied.

9. The method of claim 8, wherein the control channels of the other UEs and the control channel of the UE are multiplexed on the same CORESET.

10. The method of claim 7, wherein the change of the antenna port is UE-specifically performed.

11. A user equipment (UE) for receiving downlink control information, the UE comprising:
a receiver; and
a processor configured to control the receiver to receive information about an antenna port from a base station (BS), perform blind detection for a control channel based on the information about the antenna port, and acquire downlink control information carried by the control channel through the blind detection, wherein the information about the antenna port indicates at least one antenna port that the UE should monitor among a plurality of antenna ports used by the BS for control channel transmission, wherein the processor assumes that a specific transmit diversity scheme is applied to the at least one antenna port indicated by the information about the antenna port in performing the blind detection, wherein the antenna port used to transmit the control channel of the UE is changed in every control resource set (CORESET) and the information about the antenna port includes information about a change pattern of an antenna port changed in the every CORESET, and the change pattern is determined by performing a Modulo operation for a UE identification (ID) by a number of the at least one antenna port, and wherein the specific transmit diversity scheme is determined based on at least one of an aggregation level of the control channel, or a localized/distributed resource mapping scheme.

12. The UE of claim 11, wherein the UE is capable of communicating with at least one of another UE, a UE related to an autonomous driving vehicle, the base station or a network.

13. A base station (BS) for transmitting downlink control information, the BS comprising:
a transmitter; and
a processor configured to control the transmitter to transmit information about an antenna port to the UE and control the transmitter to transmit a control channel carrying downlink control information of the UE based on the information about the antenna port, wherein the information about the antenna port indicates at least one antenna port that the UE should monitor among a plurality of antenna ports used by the BS for control channel transmission, wherein the processor applies a specific transmit diversity scheme to at least one antenna port indicated by the information about the antenna port, wherein the antenna port used to transmit the control channel of the UE is changed in every control resource set (CORESET) and the information about the antenna port includes information about a change pattern of an antenna port changed in the every CORESET, and the change pattern is determined by performing a Modulo operation for a UE identification (ID) by a number of the at least one antenna port, and wherein the processor determines the specific transmit diversity scheme based on at least one of an aggregation level of the control channel, or a localized/distributed resource mapping scheme.

* * * * *